United States Patent [19]

Horacek

[11] Patent Number: 5,106,883
[45] Date of Patent: Apr. 21, 1992

[54] MELAMINE PREPARATION AND STABLE DISPERSION OF MELAMINE IN POLYETHER POLYOLS

[75] Inventor: Heinrich Horacek, Linz, Austria

[73] Assignee: Chemie Linz Gesellschaft m.b.H., Linz, Austria

[21] Appl. No.: 646,552

[22] Filed: Jan. 30, 1991

[30] Foreign Application Priority Data

Jan. 30, 1990 [AT] Austria .................. 197/90

[51] Int. Cl.$^5$ ............................................. C08G 18/14
[52] U.S. Cl. .................... 521/105; 521/118;
521/128; 106/18.21; 252/609; 252/182.26
[58] Field of Search ............ 521/105, 118, 128;
106/18.21; 252/609, 182.26

[56] References Cited

U.S. PATENT DOCUMENTS

| | | | |
|---|---|---|---|
| 4,293,657 | 10/1981 | Nissen et al. | 528/76 |
| 4,380,593 | 4/1983 | Von Bonin et al. | 528/76 |
| 4,644,015 | 2/1987 | Scaccia et al. | 528/76 |
| 4,745,133 | 5/1988 | Grinbergs et al. | 528/76 |

FOREIGN PATENT DOCUMENTS 0301297 2/1989 European Pat. Off.
WO88/09351 12/1988 PCT Int'l Appl.
2163762 3/1986 United Kingdom.

OTHER PUBLICATIONS

Patent Abstracts Japan 59 (1984)–029676 (Maeda et al., publ. Feb. 16, 1984).
Patent Abstracts Japan 54 (1979) 035242 (Osaka, publ. Jul. 6, 1979).
Chem. Abstracts 95: 8213d.

Primary Examiner—Maurice J. Welsh
Attorney, Agent, or Firm—Wenderoth, Lind & Ponack

[57] ABSTRACT

Melamine preparation comprising 80 to 99.9% by weight of melamine having an average particle size of 0.01 to 0.1 mm and 0.1 to 20% by weight of cyanuric acid or derivatives thereof and a stable dispersion prepared therefrom in polyether polyols, which is used for the production of flame-retardant polyurethane foams.

8 Claims, No Drawings

MELAMINE PREPARATION AND STABLE DISPERSION OF MELAMINE IN POLYETHER POLYOLS

The invention relates to a melamine preparation containing melamine and cyanuric acid, chlorides or bromides of cyanuric acid or isocyanuric acid, ammeline or ammelide, a stable dispersion prepared therefrom in polyether polyols and their use for the production of polyurethane foams.

When flame-proof polyurethane foams are produced, it is particularly advantageous to use melamine as flame retardant. This is done by reacting a dispersion of melamine in a polyol with isocyanate, foaming agents and customary additives and auxiliaries. A disadvantage of the melamine/polyol dispersions is that they have to be processed immediately, since the melamine forms sediments after only a short time. It is known from U.S. Pat. No. 4,293,657 that the shelf life of melamine/polyol dispersions can be increased by using finely ground melamine having a particle size of less than 0.01 mm and by using silica, perfluorinated alkylcarboxylic acids, alkylsulfonic acids, polyperfluoroether polyols or fatty alcohol sulfates as stabilizers. The disadvantage of these polyol dispersions is in particular that the melamine has to be milled in an additional process step requiring a high expenditure of energy. A further disadvantage of these small particles is that they lead to dispersions having high viscosities and, as a result of this, difficult handling and further processing (K. E. J. Barrett, Dispersion Polymerisation in Organic Media, FIG. 6, 2, John Wiley, London 1975). Furthermore, foams produced from dispersions having particles of such a small size have poor mechanical properties (M. Genz, O. M. Grace, S. Gagnon, PRI-Urethane Group International Symposium, "New Flame Resistant Flexible Foams" (14 Oct. 1987).

Accordingly, the object of the invention was to find a stable non-foaming melamine/polyol dispersion and a melamine preparation for preparing this dispersion in which these disadvantages do not occur. Surprisingly, the object is achieved by melamine preparations or melamine/polyol dispersions prepared therefrom which contain cyanuric acid, chlorides or bromides of cyanuric acid or isocyanuric acid, ammeline or ammelide.

Similar melamine/polyol dispersions, which, however, are stabilized with urea or urea derivatives, are described in U.S. patent application 07/497,252.

Accordingly, the present invention relates to a melamine preparation comprising 80 to 99.9% by weight, preferably 80 to 99.3% by weight, of melamine having an average particle size of 0.01 to 0.1 mm and 0.1 to 20% by weight, preferably 0.7 to 20% by weight, of cyanuric acid, chlorides or bromides of cyanuric acid or isocyanuric acid, ammeline or ammelide for preparing a stable dispersion in polyether polyols, in which 0 to 50% of the weight of melamine can be replaced by further flame retardants.

The invention further relates to a stable dispersion of melamine in polyether polyols, containing 20 to 70% by weight of melamine and, if desired, further customary additives, which dispersion is characterized in that it contains 0.1 to 5% by weight, preferably 0.5 to 5% by weight, of cyanuric acid, chlorides or bromides of cyanuric acid or isocyanuric acid, ammeline or ammelide, in that the average particle size of the melamine is 0.01 to 0.1 mm and in that 0 to 50% of the weight of melamine can be replaced by further flame retardants.

The melamine used is commercially available, for example from Chemie Linz, and an additional milling process for reducing the particle size is not required. An average particle size of 0.01 to 0.1 mm is understood to mean that at least 90% by weight of the particles have a particle size of 0.01 to 0.1 mm (DIN 66141). The melamine content of the dispersion is 20 to 70% by weight, a high melamine content in the foam leading to increased flame resistance of the final product but also to high viscosity of the dispersion. A dispersion having a solids content of, for example, 50% by weight, and comprising melamine and cyanuric acid, chlorides or bromides of cyanuric acid or isocyanuric acid, ammeline or ammelide has a viscosity which is about 5 to 15 times higher than that of the polyether polyol used.

Cyanuric acid, chlorides or bromides of cyanuric acid or isocyanuric acid are commercially available, for example from Degussa or Monsanto. The mono-, di- or trichlorides or mono-, di- or tribromides or mixtures thereof can be used. Ammelide (2-amino-4,6-dihydroxy-1,3,5-triazine) and ammeline (2,4-diamino-6-hydroxy-1,3,5-triazine) are available from Chemie Linz.

Cyanuric acid, chlorides or bromides of cyanuric acid or isocyanuric acid, ammelide or ammeline are used in amounts of 0.1 to 5% by weight, preferably 0.5 to 5% by weight, relative to the finished dispersion. In the case of high melamine contents of the dispersion, smaller additions of cyanuric acid or derivatives thereof are necessary, while in the case of low melamine contents of the dispersion higher additions of cyanuric acid or derivatives thereof are added. For example, at a melamine content of the dispersion of about 20 to 40% by weight, about 3 to 5% by weight of cyanuric acid or derivatives thereof, at a melamine content of about 40–60% by weight, about 0.3–3% by weight, and at a melamine content of about 60–70% by weight, about 0.1–0.5% by weight of cyanuric acid or derivatives thereof are added.

In addition to the dispersion-stabilizing effect, the viscosity of the dispersion also increases with increasing content of cyanuric acid or derivatives thereof. However, the viscosity of the dispersion stabilized according to the invention is less than that of comparable known dispersions having a melamine particle size of less than 0.01 mm.

Suitable polyether polyols are, for example, any polymers or polycondensation products customary in the preparation of polyurethanes and comprising ethylene oxide, propylene oxide or tetrahydrofuran. The molecular weight of the polyether polyols is usually in the range from about 200 to 6500 g/mol, and the OH number of about 25 to 600, preferably 20 to 40. It is also possible to use polymer-modified polyols, such as described, for example, in GB-A 2,163,762, which contain polymers, for example alkanolamines/isocyanate polyaddition polymers, which are dispersed during the preparation of polyurethane foams in order to influence the cell structure. Polymer-modified polyether polyols of this type are, for example, Desmophen ® 3699 or 7652 from Bayer, Multranol ® 9225 from Mobay, Niax ® 34-28 from UCC, Polyurax ® 1408, Voranol ® 8020 from DOW or Pluracol ® from BWC. Non-modified polyether polyols are, for example, Desmophen ® 3900 from Bayer or Caradol ® 36-3 from Shell. It is also possible to use mixtures of different polyols.

The melamine preparation and the melamine/polyether polyol dispersion can, if desired, contain, apart from melamine, further flame retardants, for example phosphorus-and/or halogen-containing ones, such as, for example, N-2,4,6-tribromophenylmaleimide (Chemie Linz), bis(dibromoneopentylglycol) guanidinium borate (SA 136 from Chemie Linz), tris-1,3-dichloropropyl phosphate (Amgard ® TDCP/LV from Albright and Wilson), bis(2-chloroethyl) hydrogen phosphate, diester with 2,2-bis(chloromethyl-1,3-propanediol, ethylene glycol bis(di-2-chloroethyl phosphate) (Thermolin 101, from Olin) and tris(dichloroethyl) phosphate (Disflamoll TCA from Bayer), bis(dibromoneopentyl glycol) guanidinium borate giving particularly good results.

Usually, water or halogenated hydrocarbons, for example trichlorofluoromethane, dichlorodifluoromethane or methylene chloride can be added to the dispersion as blowing agents.

Furthermore, the melamine/polyether polyol dispersions can contain additives which are customary for the preparation of polyurethanes, such as, for example, catalysts, chain-lengthening agents, crosslinking agents, foam stabilizers, pore regulators, stabilizers, fillers and auxiliaries. Examples of suitable catalysts are tin octoate, dibutyltin dilaurate or diazobicyclooctane (for example Dabco ® 33LV from Air Products), suitable foam stabilizers are polysiloxane/polyoxyalkylene copolymers, such as, for example, Silicon 5043 from Dow Corning, suitable crosslinking agents are diethanolamine or glycerol, and suitable chain-lengthening agents are butanediol or ethylene glycol.

The dispersions according to the invention are simple to prepare and do not foam. They are prepared by adding melamine, cyanuric acid or derivatives thereof and the additives desired in each case at temperatures of about 20° to 80° C. with stirring and then homogenizing the mixture, for example using a conventional anchor stirrer. The use of a ball mill is not necessary.

The invention also relates to a process for the production of flame-retardant polyurethane foams, in which a stable dispersion of melamine containing cyanuric acid, chlorides or bromides of cyanuric acid or isocyanuric acid, ammeline or ammelide and having an average particle size of 0.01 to 0.1 mm in polyether polyols is reacted with conventional di- or polyisocyanates, conventional foaming agents and, if desired, conventional auxiliaries to give the polyurethane foam.

The foams can be prepared, for example, as described in U.S. Pat. No. 4,293,657 by reacting the dispersions with an isocyanate, for example with diphenylmethane diisocyanate or toluidine diisocyanate with the addition of conventional foaming agents and auxiliaries. The dispersion used can, if desired, be further diluted before the reaction with a polyol. Since the dispersions do not contain any surface-active substances, such as, for example, emulsifiers or soaps, the reaction takes place in a controlled fashion with the formation of a uniform cell structure and in the absence of any interference in the foaming behavior aided by foam stabilizers.

COMPARATIVE EXAMPLE CI 325 kg of a polymer-modified polyether polyol having a viscosity of 1500 mPas as measured at 25° C. and an OH number of 31 (as per Desmophen ® 7652 from Bayer) were initially introduced into a 1 m³ stirred boiler equipped with an anchor stirrer, and 325 kg of melamine, which corresponds to a melamine content of the dispersion of 50% by weight, were stirred in at 80° C. and a stirring rate of 60 rpm over a period of 30 minutes. The stirring rate selected is such that only a weak vortex is formed. To homogenize the dispersion, stirring was then continued for 120 minutes. The dispersion obtained had a viscosity of 14,000 mPas (20° C.) and formed a sediment within 3 days.

EXAMPLE 1

325 kg of a polymer-modified polyether polyol, as per Desmophen ® 7652 from Bayer, were initially introduced into a 1 m³ stirred boiler equipped with an anchor stirrer, and a mixture of 9.75 kg of cyanuric acid (from CdF) having an average particle size of less than 0.2 mm and 315.25 kg of melamine (from Chemie Linz) were stirred in at 80° C. and a stirring rate of 60 rpm over a period of 30 minutes. The melamine used had a particle size distribution such that 95% by weight of the particles had a particle size of 0.01 to 0.1 mm (DIN 66141). To homogenize the dispersion, stirring was then continued for 120 minutes. The viscosity of the dispersion obtained was 15,000 mPas (20° C.); it was chemically and physically stable for more than 6 months without forming a sediment.

EXAMPLES 2 to 7

Analogously to Example 1, melamine dispersions were prepared by adding the amounts of melamine and cyanuric acid or derivatives thereof shown in Table 1.

The stability of all dispersions was more than 6 months without sedimentation taking place.

PRODUCTION OF FOAMS

The melamine/polyether polyol dispersions prepared according to Examples 1 to 7 were each mixed according to the following recipe:

80 parts by weight of melamine dispersion, 60 parts by weight of the particular polyol, 1.5 parts by weight of water as foaming agent, 0.05 part by weight of dibutyltin dilaurate as catalyst, 0.5 part by weight of 85% diethanolamine as crosslinking agent and 0.08 part by weight of Dabco ® 33LV (33% solution of triethylenediamine in dipropylene glycol, from Air Products) as catalyst, 1.0 part by weight of Silicon 5043 (Dow Corning) as foam stabilizer, 5 parts by weight of Thermolin ® 101 (ethylene glycol bis(di-2-chloroethyl phosphate), from Olin) and 10 parts by weight of Frigen ® 11 (Hoechst).

This mixture was then stirred with 22 parts by weight of toluylidene diisocyanate (TDI 80 from Bayer) for 3 seconds and was formed into an open block mold in order to form the polyurethane foam. The pot time in each case was about 20 seconds, the rise time 60 seconds and the gel time 90 seconds.

The polyurethane foam obtained was tested for tensile strength (DIN 53571), resistance to tear propagation (DIN 53575), compression set after 90% deformation (DIN 53572), density (DIN 53420) and fire behavior (BS 5852-2). According to BS 5852-2, about 1 kg of the polyurethane foam is set on fire using Crib 5, a maximum weight loss of 60 g being permissible. The values are summarized in Table 2 together with the mechanical properties of the flexible foams.

TABLE 1

Melamine dispersions in polyether polyols

| | Melamine (% by weight) | Cyanuric acid/ Derivatives* (% by weight) | Polyether polyol | Viscosity/ 20° (mPas) | Density/ 20° (g/ml) |
|---|---|---|---|---|---|
| V1 | 50 | — | Desmophen 7652 | 14,000 | 1.22 |
| 1 | 48.5 | 1.5 CA | Desmophen 7652 | 15,000 | 1.22 |
| 2 | 48 | 2 CA | Desmophen 7652 | 20,000 | 1.22 |
| 3 | 47 | 3 CA | Desmophen 7652 | 18,500 | 1.22 |
| 4 | 48 | 2 AN | Desmophen 7652 | 14,500 | 1.22 |
| 5 | 48 | 2 AD | Desmophen 7652 | 16,500 | 1.22 |
| 6 | 48.5 | 1.5 TC | Desmophen 7652 | 18,000 | 1.22 |
| 7 | 48.5 | 1.5 CC | Desmophen 7652 | 18,500 | 1.22 |

*CA Cyanuric acid
AN Ammeline
AD Ammelide
TC Trichloroisocyanuric acid
CC Cyanuric chloride

TABLE 2

Flexible Foams

| | Density (kg/m³) | Resistance to tear propagation (N/m) | Tensile strength (kPa) | Compression set 90% deformation (%) | Fire Behavior weight loss (g) | Specimen weight (g) |
|---|---|---|---|---|---|---|
| 1 | 39 | 275 | 95 | 10 | 20 | 1005 |
| 2 | 40 | 280 | 102 | 9 | 16 | 1010 |
| 3 | 41 | 285 | 100 | 8 | 18 | 995 |
| 4 | 38 | 270 | 94 | 7 | 19 | 1000 |
| 5 | 41 | 290 | 105 | 10 | 21 | 1003 |
| 6 | 39 | 279 | 101 | 9 | 17 | 1003 |
| 7 | 40 | 281 | 97 | 11 | 15 | 1011 |

I claim:

1. Melamine preparation comprising 80 to 99.9% by weight of melamine having an average particle size of 0.01 to 0.1 mm and 0.1 to 20% by weight of cyanuric acid, chlorides or bromides of cyanuric acid or isocyanuric acid, ammeline or ammelide for preparing a stable dispersion in polyether polyols, in which 0 to 50% of the weight of melamine can be replaced by further flame retardants.

2. Melamine preparation according to claim 1, containing 80 to 99.3% by weight of melamine and 0.7 to 20% by weight of cyanuric acid, chlorides or bromides of cyanuric acid or isocyanuric acid, ammeline or ammelide.

3. Stable dispersion of melamine in polyether polyols, containing 20 to 70% by weight of melamine, 0.1 to 5% by weight of cyanuric acid, chlorides or bromides of cyanuric acid or isocyanuric acid, ammeline or ammelide, and, if desired, further customary additives, in which the average particle size of the melamine is 0.01 to 0.1 mm and 0 to 50% of the weight of melamine can be replaced by further flame retardants.

4. Stable dispersion according to claim 3, which contains 0.5 to 5% by weight of cyanuric acid, chlorides or bromides of cyanuric acid or isocyanuric acid, ammeline or ammelide.

5. Stable dispersion according to claim 3, in which the polyether polyols have an OH number of 20 to 40.

6. Melamine preparation according to claim 1, in which the further flame retardant, if added, is bis(dibromoneopentyl glycol) guanidinium borate.

7. Process for the preparation of a stable dispersion according to claim 3, in which 20 to 70% by weight of melamine having an average particle size of 0.01 to 0.1 mm, it being possible for 0 to 50% of the weight of melamine to be replaced by further flame retardants, 0.1 to 5% by weight of cyanuric acid, chlorides or bromides of cyanuric acid or isocyanuric acid, ammeline or ammelide, each relative to the total weight of the dispersion, and, if desired, further customary additives are stirred into a polyether polyol and homogenized.

8. Process for the production of flame-retardant polyurethane foams, in which a stable dispersion of melamine containing cyanuric acid, chlorides or bromides of cyanuric acid or isocyanuric acid, ammeline or ammelide and having an average particle size of 0.01 to 0.1 mm in polyether polyols according to claim 3 is reacted with conventional di- or polyisocyanates, conventional foaming agents and, if desired, conventional auxiliaries to give the polyurethane foam.

* * * * *